(12) United States Patent
Min et al.

(10) Patent No.: US 12,728,917 B2
(45) Date of Patent: Sep. 8, 2026

(54) CONTROL APPARATUS AND METHOD OF REAR-WHEEL STEERING SYSTEM

(71) Applicant: HYUNDAI MOBIS CO., LTD., Seoul (KR)

(72) Inventors: Kyoung Wook Min, Yongin-si (KR); Pil Woo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 6 days.

(21) Appl. No.: 19/005,740

(22) Filed: Dec. 30, 2024

(65) Prior Publication Data

US 2025/0222982 A1 Jul. 10, 2025

(30) Foreign Application Priority Data

Jan. 9, 2024 (KR) ........................ 10-2024-0003532

(51) Int. Cl.
*B62D 7/15* (2006.01)

(52) U.S. Cl.
CPC .................................... *B62D 7/159* (2013.01)

(58) Field of Classification Search
CPC ...... B62D 7/159; B62D 5/0457; B62D 6/002; B60Y 2400/84
USPC ........................................ 701/41, 42, 43, 44
See application file for complete search history.

(56) References Cited

U.S. PATENT DOCUMENTS

2022/0219754 A1 7/2022 Abdelfatah

FOREIGN PATENT DOCUMENTS

KR 10-2020-0136276 A 9/2024

*Primary Examiner* — Hai H Huynh
(74) *Attorney, Agent, or Firm* — NovoTechIP International PLLC

(57) ABSTRACT

The present disclosure relates to a control apparatus and method of a rear-wheel steering system. The control apparatus of a rear-wheel steering system includes: a plurality of sensors configured to detect information on a vehicle status; and a processor configured to: check the vehicle status in response to signals input from the plurality of sensors and determine a control mode for a rear-wheel steering (RWS) system as one of reverse-phase control, in-phase control, and neutral control; and, in the event of a sharp steering situation, change the control mode for the RWS system and perform control. The control apparatus and method of a rear-wheel steering system may improve responsiveness through reverse-phase control in the RWS system and enhance safety by performing neutral control in a sharp steering situation, thereby enhancing steering performance of the RWS system.

16 Claims, 5 Drawing Sheets

FIG. 4

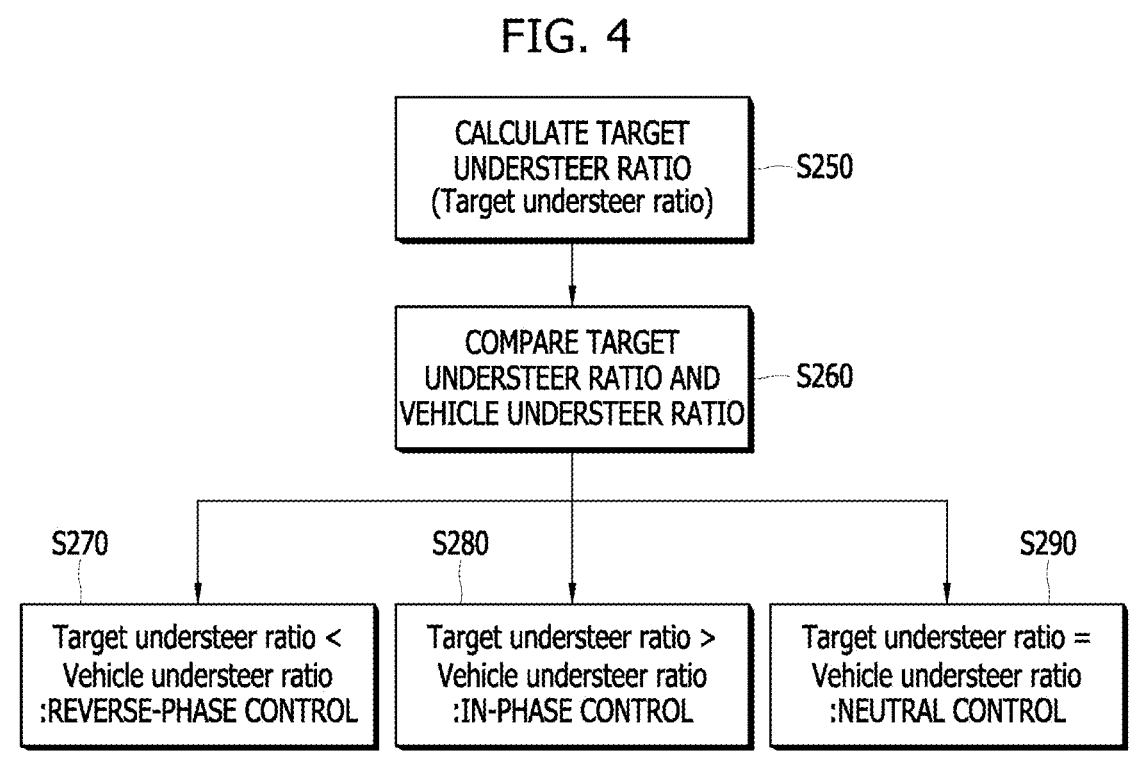

CALCULATE TARGET UNDERSTEER RATIO (Target understeer ratio) — S250

COMPARE TARGET UNDERSTEER RATIO AND VEHICLE UNDERSTEER RATIO — S260

S270: Target understeer ratio < Vehicle understeer ratio :REVERSE-PHASE CONTROL

S280: Target understeer ratio > Vehicle understeer ratio :IN-PHASE CONTROL

S290: Target understeer ratio = Vehicle understeer ratio :NEUTRAL CONTROL

CONTROL APPARATUS AND METHOD OF REAR-WHEEL STEERING SYSTEM

CROSS-REFERENCE TO RELATED APPLICATIONS

This application claims priority from and the benefit of Korean Patent Application No. 10-2024-0003532, filed on Jan. 9, 2024, which is hereby incorporated by reference for all purposes as if set forth herein.

TECHNICAL FIELD

Exemplary embodiments of the present disclosure relate to a control apparatus and method of a rear-wheel steering (RWS) system, which may improve performance of the RWS system.

BACKGROUND

In general, a motor-driven power steering (MDPS) system uses an electric motor to provide auxiliary torque in a direction a driver steers, thereby making handling lighter.

In general, such a steering system is connected to front wheels to adjust the direction of front wheels, thereby changing a vehicle's driving direction.

However, for front-wheel steering, the lateral force generation timing of front and rear wheels differs, thereby causing a difference between the driver's line of sight and a vehicle's driving direction and limiting a turning radius.

As a result, a rear-wheel steering (RWS) system has been increasingly incorporated into vehicles in recent years.

The rear-wheel steering system may control a direction of rear wheels by operating control logic that responds to a driving condition.

When equipped with the rear-wheel steering system, a vehicle has a reduced turning radius, which makes it easier to change direction when the vehicle makes a turn or changes direction along a curved road.

However, the rear-wheel steering system suddenly changes the control method during an abrupt direction change, causing instability in vehicle behavior. In particular, a transition between reverse-phase control and in-phase control may cause instability in vehicle behavior.

Thus, in the rear-wheel steering system, there is a need for a measure that may improve responsiveness in response to the vehicle behavior and enhance safety.

The related art of the present disclosure is disclosed in Korean Patent Application Publication No. 10-2020-0136276 (entitled "STEERING CONTROL METHOD AND APPARATUS FOR REAR WHEEL STEERING SYSTEM").

SUMMARY

An objective of the present disclosure is to provide a control apparatus and method of a rear-wheel steering (RWS) system, which may improve responsiveness and enhance safety when controlling the RWS system.

A control apparatus of a rear-wheel steering (RWS) system according to an aspect of the present disclosure includes: a plurality of sensors configured to detect information on a vehicle status; and a processor configured to: check the vehicle status in response to signals input from the plurality of sensors and determine a control mode for a RWS system as one of reverse-phase control, in-phase control, and neutral control; and, in the event of a sharp steering situation, change the control mode for the RWS system and perform control.

The processor is configured to: calculate a target understeer ratio based on an estimated value of a side-slip angle and a vehicle speed; and determine the control mode by comparing the target understeer ratio and a vehicle understeer ratio.

The processor is configured to: perform the reverse-phase control when the target understeer ratio is lower than the vehicle understeer ratio; perform the in-phase control when the target understeer ratio is higher than the vehicle understeer ratio; and perform the neutral control when the target understeer ratio is equal to the vehicle understeer ratio.

The processor is configured to stop the reverse-phase control and perform the neutral control, when the sharp steering situation occurs while the processor is performing the reverse-phase control.

The processor is configured to determine any one of the following cases as the sharp steering situation: if a front-wheel steering angle input from the sensor is greater than a phase control angle limit, or if a front-wheel steering angle velocity is greater than a phase control angle velocity limit.

A control method of a rear-wheel steering (RWS) system according to an aspect of the present disclosure includes: detecting, by a plurality of sensors, information on a vehicle status; checking, by a processor, the vehicle status in response to signals input from the plurality of sensors and determining, by the processor, a control mode for a RWS system as one of reverse-phase control, in-phase control, and neutral control; and, in the event of a sharp steering situation, changing, by the processor, the control mode for the RWS system and performing, by the processor, control.

Said determining a control mode includes: calculating an estimated value of a side-slip angle; calculating a target understeer ratio based on the estimated value of a side-slip angle and a vehicle speed; and determining the control mode by comparing the target understeer ratio and a vehicle understeer ratio.

Said determining a control mode includes: performing the reverse-phase control when the target understeer ratio is lower than the vehicle understeer ratio; performing the in-phase control when the target understeer ratio is higher than the vehicle understeer ratio; and performing the neutral control when the target understeer ratio is equal to the vehicle understeer ratio.

In said changing the control mode and performing control, the processor is configured to stop the reverse-phase control and perform the neutral control, when the sharp steering situation occurs while the processor is controlling the RWS system by using the reverse-phase control.

In said changing the control mode and performing control, the processor is configured to determine any one of the following cases as the sharp steering situation: if a front-wheel steering angle input from the sensor is greater than a phase control angle limit, or if a front-wheel steering angle velocity is greater than a phase control angle velocity limit.

The control apparatus and method of a rear-wheel steering system according to an aspect of the present disclosure may improve responsiveness when controlling the RWS system during driving at medium or high speed.

The control apparatus and method of a rear-wheel steering system according to an aspect of the present disclosure may safely control direction in a sharp steering situation, thereby significantly enhancing vehicle behavioral safety.

The control apparatus and method of a rear-wheel steering system according to an aspect of the present disclosure may significantly improve driving performance through rear-wheel steering.

BRIEF DESCRIPTION OF THE DRAWINGS

FIG. 4 is a view illustrating a method for determining, based on a target understeer ratio, a method for rear-wheel control by the control apparatus according to an embodiment of the present disclosure.

DETAILED DESCRIPTION

Figure 1:
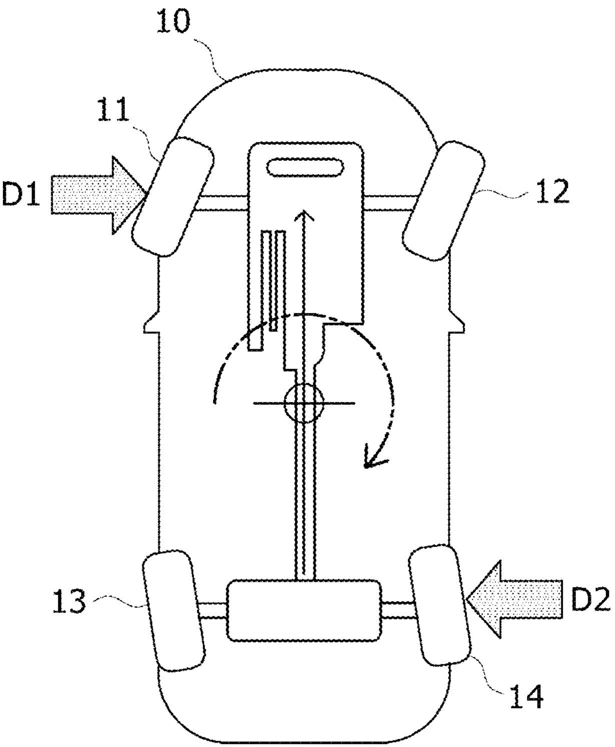
FIG. 1 is a view illustrating wheel directions of a vehicle according to a rear-wheel steering system according to an embodiment of the present disclosure.

Hereinafter, the present disclosure will be described below with reference to the accompanying drawings.

It should be considered that the thickness of each line or the size of each component in the drawings may be exaggeratedly illustrated for clarity and convenience of description. In addition, the terms as used herein are defined in consideration of functions thereof in the present disclosure, and these terms may change depending on a user or operator's intention or practice. Therefore, definitions of these terms will have to be made based on the content herein.

FIG. 1 is a view illustrating wheel directions of a vehicle according to a rear-wheel steering (RWS) system according to an embodiment of the present disclosure.

As illustrated in FIG. 1, a control apparatus according to the present disclosure controls a RWS system.

A vehicle 10 may control a driving direction by controlling not only front wheels but also rear wheels through the RWS system.

Accordingly, when making a turn, the vehicle 10 may reduce a turning radius, enhance steering efficiency, and improve driving stability.

When the vehicle 10 is driving at low speed, the control apparatus controls the RWS system to enable the rear wheels to operate in reverse-phase.

In addition, when the vehicle 10 is driving at medium or high speed, the control apparatus may control the RWS system to perform reverse-phase control in an on-center region and to enable the rear wheels to operate in-phase with the front wheels in an off-center region.

For example, the control apparatus may control front wheels 11 and 12 in a first direction D1 through a front-wheel steering (FWS) system, and control rear wheels 13 and 14 in a second direction D2 that is different from the first direction D1 through the RWS system.

Accordingly, the vehicle 10 may drive on a curved road while reducing its turning radius.

The control apparatus may perform the on-center reverse-phase control to enhance vehicle responsiveness, and may perform the off-center in-phase control to enhance behavioral safety.

In addition, the control apparatus may perform neutral control when the rear wheels are steered abruptly (a sharp steering situation) to enhance behavioral safety.

Depending on the type of vehicle, the RWS system is applicable to at least one of the followings: an internal combustion engine (ICE), a hybrid electric vehicle (HEV), a plug-in hybrid electric vehicle (PHEV), a battery electric vehicle (BEV), and a fuel cell electric vehicle (FCEV).

The control apparatus according to the present disclosure may be applied to any type of vehicle equipped with the RWS system.

Figure 2:
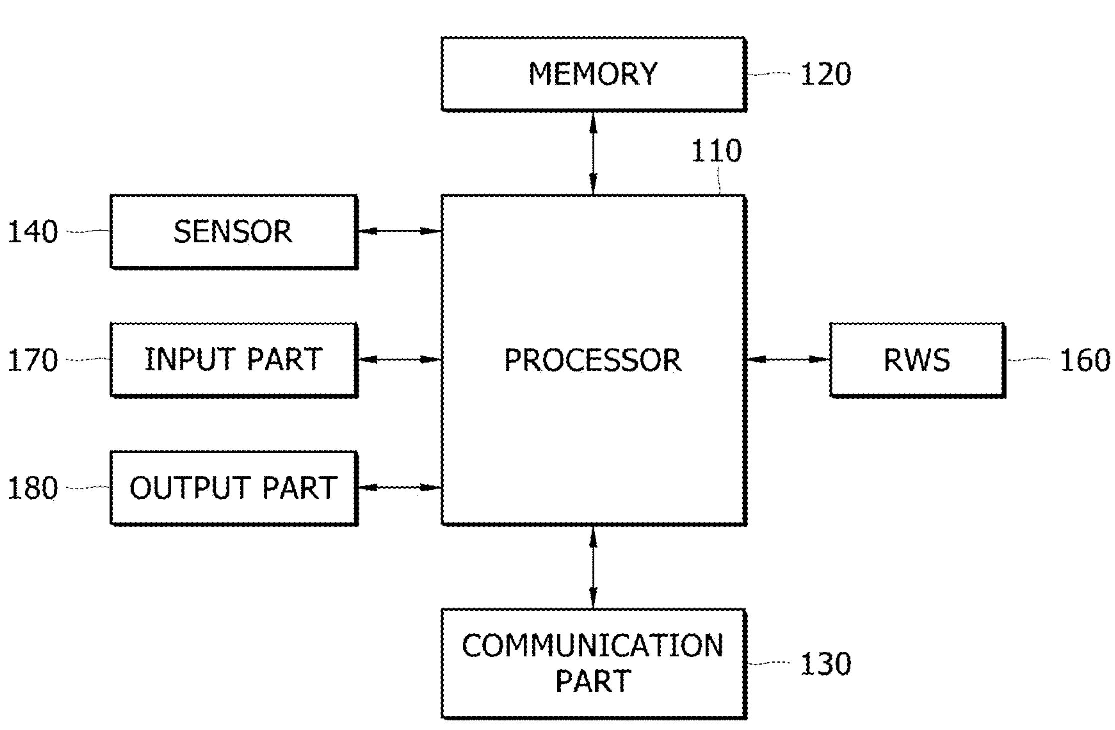
FIG. 2 is a block diagram illustrating a control configuration of a control apparatus according to an embodiment of the present disclosure.

FIG. 2 is a block diagram illustrating a control configuration of a control apparatus according to an embodiment of the present disclosure.

As illustrated in FIG. 2, a control apparatus 100 according to the present disclosure may include a sensor 140, a memory 120, communication part 130, an input part 170, an output part 180, and a processor 110.

The sensor 140 may include a vehicle speed sensor, an angular velocity sensor, a steering angle sensor, a column torque sensor, a wheel speed sensor, and a torque sensor.

The steering angle sensor may be provided on a steering wheel (not illustrated) to detect a steering angle based on a turning operation of the steering wheel. The column torque sensor may detect steering torque based on an operation of the steering wheel, and may detect column torque acting on a column. In addition, the wheel speed sensors are installed on a plurality of wheels, respectively, to detect the turning speed of the wheels.

The memory 120 may store data on a rear-wheel control mode, data measured through the plurality of sensors, data calculated during steering control, control data, and data on the RWS system.

In addition, the memory 120 stores data transmitted and received through the communication part 130, and stores data generated during an operation of the processor 110.

The memory 120 may store data on at least one of the followings: a steering control algorithm, a rear-wheel steering control algorithm, a reverse-phase control algorithm, an in-phase control algorithm, a neutral control algorithm, and a vehicle control algorithm.

The memory 120 may include storage means such as random access memory (RAM), non-volatile memory such as random access memory (ROM) and electrically erased programmable ROM (EEPROM), and flash memory.

The communication part 130 transmits and receives data between the processor 110 and other components of the vehicle (e.g., ECU and MCU). The communication part 130 may include a driver for controller area network (CAN) communication or a driver for local interconnect network (LIN) communication to transmit and receive data.

In addition, the communication part 130 may include a wired or wireless communication module to communicate with a mobile terminal or an external server. For example, the communication part 130 may communicate using at least one of the following communication methods: short-range communications such as Ethernet, WiFi, and Bluetooth; mobile communication; and serial communication. In addition, the communication part 130 may communicate through wireless access in vehicular environment (WAVE) for communication between vehicles and road infrastructure, and vehicle to everything (V2X) for communication between vehicles.

The input part 170 may include at least one input means among a switch, a button, and a touchpad.

For example, the input part 170 may include a driving mode switch, an audio switch, a navigation switch, a steering-wheel switch, a brake pedal, an accelerator pedal, a gear lever, a parking brake system button, and the like.

The output part 180 may output information on the vehicle according to a control command from the processor 110, and may output a warning or notification in response to an error in the event of a vehicle malfunction or anomaly.

The output part 180 may include at least one of an LED lamp, a display, and a speaker. The output part 180 may output data on a vehicle status and a set mode through a display.

The output part 180 may output at least one of a sound effect, warning tone, and voice guidance through a speaker. The output part 180 may perform output by changing a color of the LED lamp or changing a flashing cycle.

The processor 110 may control the input/output of the input part 170 and the output part 180, enable data to be stored in the memory 120, or read data stored in the memory 120 to control an operation of the vehicle.

The processor 110 may determine, based on signals received from the plurality of sensors, a control mode according to rear-wheel control, and may perform steering control for the rear wheels.

During driving at low speed, the processor 110 controls the RWS system to enable the rear wheels to operate in reverse-phase to the front wheels.

When the vehicle is driving at medium or high speed, the processor 110 may control the RWS system to enable the rear wheels to operate in reverse-phase to the front wheels in the on-center center region, and may control the RWS system to enable the rear wheels to operate in-phase with the front wheels in the off-center region.

In this case, the processor 110 may perform reverse-phase control in the on-center region at medium or high speed to improve responsiveness.

However, if the processor 110 performs reverse-phase control in a sharp steering situation or in the off-center region, safety may be diminished. Thus, the processor 110 may distinguish a sharp steering situation and control the RWS system differently. If a sharp steering situation occurs in a reverse-phase control situation, the processor 110 may perform neutral control without performing reverse-phase control.

The processor 110 may estimate a side-slip angle and compute a target understeer ratio based on the estimated side-slip angle and a vehicle speed measured through the sensor 140.

The processor 110 may compare the target understeer ratio and a vehicle understeer ratio and perform steering control for the rear wheels.

The processor 110 may control the RWS system by comparing the target understeer ratio and the vehicle understeer ratio, and based on the comparison result, determining one of reverse-phase control, in-phase control, and neutral control as the control mode.

In this case, the processor 110 controls the RWS system through one of reverse-phase control, in-phase control, and neutral control, but if a sharp steering situation or a diagonal control situation (the off-center region) at or above a certain angle occurs during reverse-phase control, stability may decrease. Thus, if a sharp steering situation occurs in a reverse-phase control situation, the processor 110 may perform neutral control without performing reverse-phase control.

The processor 110 receives input of a front-wheel steering angle and a front-wheel steering angle velocity measured through the sensor 140 in the reverse-phase control situation, respectively, and compares the received front-wheel steering angle and angle velocity with set values to distinguish a sharp steering situation. In a sharp steering situation, the processor 110 may perform neutral control without performing reverse-phase control.

The processor 110 may determine any one of the following cases as the sharp steering situation: if the front-wheel steering angle is greater than a phase control angle limit, or if the front-wheel steering angle velocity is greater than a phase control angle velocity limit. As described above, the processor 110 may perform neutral control without performing reverse-phase control in a sharp steering situation.

The processor 110 may perform neutral control on the RWS system by fixing a final target understeer ratio to the vehicle understeer ratio.

The processor 110 may use the final target understeer ratio as a value calculated by a tuning map except under the conditions described above.

The processor 110 may control the RWS system through specified in-phase control or neutral control for in-phase control or neutral control, respectively.

Thus, the control apparatus 100 may resolve an issue that may occur during reverse-phase control, improve responsiveness in the rear-wheel control system, and secure safety in vehicle behavior.

Figure 3:
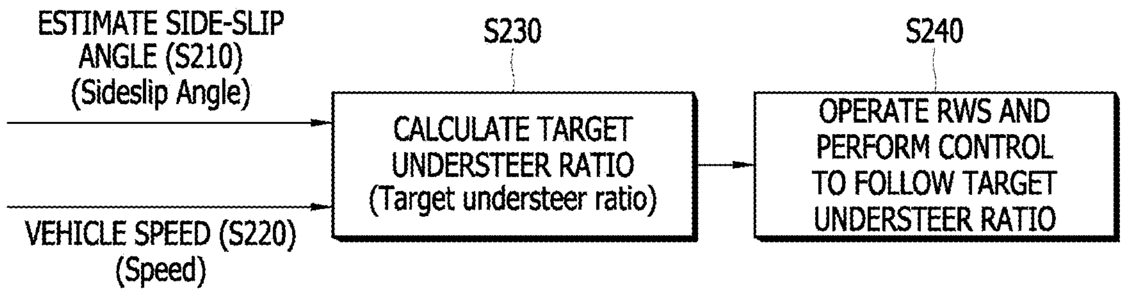
FIG. 3 is a view illustrating a data flow according to rear-wheel control by the control apparatus according to an embodiment of the present disclosure.

FIG. 3 is a view illustrating a data flow according to rear-wheel control by the control apparatus according to an embodiment of the present disclosure.

As illustrated in FIG. 3, the control apparatus 100 may control rear-wheel steering based on side-slip and understeer in the RWS system.

Understeer refers to a phenomenon where the vehicle 10 moves outward from its target path while accelerating during cornering, resulting in reduced straight-line stability. In addition, side-slip is a condition where wheel misalignment causes the tires to skid off an intended driving direction.

The processor 110 estimates a side-slip angle (S210) and, based on speed input from the sensor 140 (S220), calculates a target understeer ratio (S230).

The processor 110 may compare the calculated target understeer ratio and the vehicle understeer ratio and control the RWS system such that the vehicle understeer ratio follows the target understeer ratio (S240).

Performing reverse-phase control at medium or high speed may improve responsiveness, but may decrease stability. In particular, when reverse-phase control is performed in a sharp steering situation, safety is diminished. Thus, the processor 110 may enhance safety by distinguishing a sharp steering situation and performing neutral control without performing reverse-phase control.

Thus, when performing reverse-phase control on the rear-wheel steering system based on a target understeer ratio, the processor 110 may enhance responsiveness by performing reverse-phase control in the on-center region where the steering angle is approximately 10 degrees. When a sharp steering situation occurs during reverse-phase control, the processor 110 may enhance safety by performing neutral control without performing reverse-phase control. In addition, the processor 110 may perform in-phase control in the off-center region.

FIG. 4 is a view illustrating a method for determining, based on a target understeer ratio, a method for rear-wheel control by the control apparatus according to an embodiment of the present disclosure.

As illustrated in FIG. 4, the control apparatus 100 calculates a target understeer ratio (S250). The processor 110 may calculate a target understeer ratio based on an estimated side-slip angle and a vehicle speed.

The processor 110 compares the target understeer ratio and the vehicle understeer ratio (S260).

The processor 110 performs reverse-phase control if the target understeer ratio is lower than the vehicle understeer ratio (S270).

The processor 110 may perform in-phase control if the target understeer ratio is higher than the vehicle understeer ratio (S280).

In addition, the processor 110 may perform neutral control if the target understeer ratio is equal to the vehicle understeer ratio (S290).

In this case, the processor 110 may control the RWS system based on the target understeer ratio and the vehicle understeer ratio, but may define an exception for reverse-phase control and control the RWS system.

When the processor 110 determines that reverse-phase control is required, the processor 110 may perform reverse-phase control on the RWS system, but may perform neutral control without performing reverse-phase control in a sharp steering situation.

Figure 5:
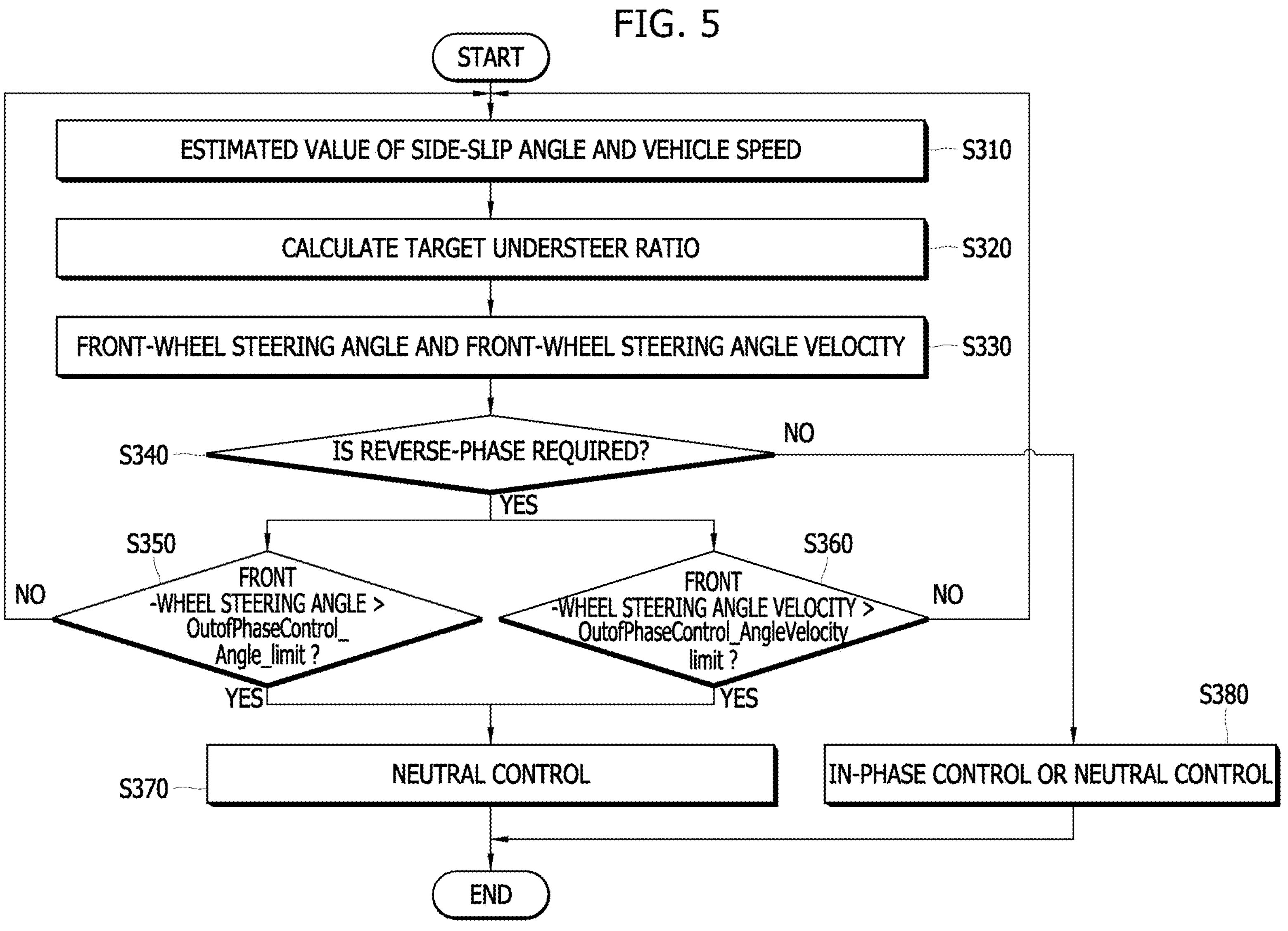
FIG. 5 is a flowchart illustrating a control method of the control apparatus according to an embodiment of the present disclosure.

FIG. 5 is a flowchart illustrating a control method of the control apparatus according to an embodiment of the present disclosure.

As illustrated in FIG. 5, the control apparatus 100 may control the RWS system by considering side-slip and understeer.

The processor 110 estimates a side-slip angle and receives vehicle speed input from the sensor 140 (S310).

The processor 110 calculates a target understeer ratio based on the estimated side-slip angle and the vehicle speed (S320).

Meanwhile, the processor 110 may receive a front-wheel steering angle and a front-wheel steering angle velocity from the sensor 140 (S330).

The processor 110 may compare the previously calculated target understeer ratio and the vehicle understeer ratio and control the RWS system such that the vehicle understeer ratio follows the target understeer ratio.

The processor 110 may perform reverse-phase control when the target understeer ratio is lower than the vehicle understeer ratio, perform in-phase control when the target understeer ratio is higher than the vehicle understeer ratio, and perform neutral control when the target understeer ratio is equal to the vehicle understeer ratio.

When reverse-phase control is required (S340), the processor 110 determines whether a sharp steering situation is present.

When reverse-phase control is not required, the processor 110 may perform specified in-phase control or neutral control (S380).

The processor 110 determines whether the front-wheel steering angle is greater than the phase control angle limit (S350).

In addition, the processor 110 determines whether the front-wheel steering angle velocity is greater than the phase control angle velocity limit (S360).

The processor 110 may determine whether a sharp steering situation is present based on the front-wheel steering angle and the front-wheel steering angle velocity. In addition, when the steering angle is greater than a certain value, the processor 110 may determine off-center control is required.

The processor 110 may determine any one of the following cases as the sharp steering situation: if the front-wheel steering angle is greater than the phase control angle limit, or if the front-wheel steering angle velocity is greater than the phase control angle velocity limit, and thus may perform neutral control without performing reverse-phase control (S370).

The processor 110 may perform reverse-phase control based on the target understeer ratio to improve responsiveness, but may stop reverse-phase control and perform neutral control if a sharp steering situation occurs during reverse-phase control.

Thus, the control apparatus and method of a rear-wheel steering system may improve responsiveness by using reverse-phase control in the RWS system and enhance safety by performing neutral control in a sharp steering situation, thereby enhancing steering performance of the RWS system.

Although the present disclosure has been described with reference to the embodiments illustrated in the drawings, the embodiments are for illustrative purposes only, and those skilled in the art will appreciate that various modifications and other equivalent embodiments are possible from the embodiments. Therefore, the true technical protection scope of the present disclosure will be determined by the following claims.

What is claimed is:

1. A control apparatus of a rear-wheel steering (RWS) system, comprising:

a plurality of sensors configured to detect a vehicle status; and a processor configured to:

check the vehicle status in response to signals input from the plurality of sensors and determine a control mode for the RWS system, the control mode being one of reverse-phase control, in-phase control, and neutral control; and in an event of a sharp steering situation, change the control mode for the RWS system and perform controlling the RWS system.

2. The control apparatus of claim 1, wherein the processor is configured to:

calculate a target understeer ratio based on an estimated value of a side-slip angle and a vehicle speed; and determine the control mode based on comparing the target understeer ratio and a vehicle understeer ratio.

3. The control apparatus of claim 1, wherein the processor is configured to stop the reverse-phase control and perform the neutral control in response to an occurrence of the sharp steering situation while the processor is performing the reverse-phase control.

4. The control apparatus of claim 1, wherein the processor is configured to determine that the sharp steering situation has occurred in response to:

a front-wheel steering angle input from the plurality of sensors being greater than a phase control angle limit; or a front-wheel steering angle velocity being greater than a phase control angle velocity limit.

5. The control apparatus of claim 1, wherein the processor is further configured to perform reverse-phase control in an on-center steering region and to perform in-phase control in an off-center steering region.

6. The control apparatus of claim 1, wherein performing the neutral control comprises fixing a final target understeer ratio equal to a vehicle understeer ratio.

7. The control apparatus of claim 1, wherein the processor is further configured to compute a final target understeer ratio using a tuning map.

8. A control apparatus of a rear-wheel steering (RWS) system, comprising:

a plurality of sensors configured to detect a vehicle status; and a processor configured to:

check the vehicle status in response to signals input from the plurality of sensors and determine a control mode for the RWS system, the control mode being one of reverse-phase control, in-phase control, and neutral control; and in an event of a sharp steering situation, change the control mode for the RWS system and perform controlling the RWS system;

wherein the processor is configured to:

calculate a target understeer ratio based on an estimated value of a side-slip angle and a vehicle speed;

determine the control mode based on comparing the target understeer ratio and a vehicle understeer ratio;

perform the reverse-phase control in response to the target understeer ratio being lower than the vehicle understeer ratio;

perform the in-phase control in response to the target understeer ratio being higher than the vehicle understeer ratio; and perform the neutral control in response to the target understeer ratio being equal to the vehicle understeer ratio.

9. The control apparatus of claim 8, wherein the processor is further configured to perform reverse-phase control in an on-center steering region and to perform in-phase control in an off-center steering region.

10. The control apparatus of claim 8, wherein performing the neutral control comprises fixing a final target understeer ratio equal to a vehicle understeer ratio.

11. The control apparatus of claim 8, wherein the processor is further configured to compute a final target understeer ratio using a tuning map.

12. A control method of a rear-wheel steering (RWS) system, comprising:

detecting, using a plurality of sensors, a vehicle status;

based on the vehicle status detected using signals input from the plurality of sensors, determining a control mode for the RWS system, the control mode being one of reverse-phase control, in-phase control, and neutral control; and in an event of a sharp steering situation, responding to the sharp steering situation by changing the control mode for the RWS system among reverse-phase control, in-phase control, and neutral control and performing controlling the RWS system accordingly.

13. The control method of claim 12, wherein determining the control mode for the RWS system comprises:

calculating an estimated value of a side-slip angle;

calculating a target understeer ratio based on the estimated value of the side-slip angle and a vehicle speed; and determining the control mode based on comparing the target understeer ratio and a vehicle understeer ratio.

14. The control method of claim 13, wherein determining the control mode comprises:

performing the reverse-phase control in response to the target understeer ratio being lower than the vehicle understeer ratio;

performing the in-phase control in response to the target understeer ratio being higher than the vehicle understeer ratio; and performing the neutral control in response to the target understeer ratio being equal to the vehicle understeer ratio.

15. The control method of claim 12, wherein changing the control mode and performing controlling the RWS system comprise stopping the reverse-phase control and performing the neutral control in response to an occurrence of the sharp steering situation while the reverse-phase control is being performed.

16. The control method of claim 15, wherein changing the control mode and performing controlling the RWS system comprise determining that the sharp steering situation has occurred in response to:

a front-wheel steering angle input from the plurality of sensors being greater than a phase control angle limit; or a front-wheel steering angle velocity being greater than a phase control angle velocity limit.

* * * * *